April 24, 1928.

H. M. H. REUFEL ET AL 1,667,677

WIRE COILING MACHINE

Filed Dec. 17, 1924

Inventors:
Heinrich M. H. Reufel,
Hendrick de Jong,
William G. F. Wentink,
by
Their Attorney.

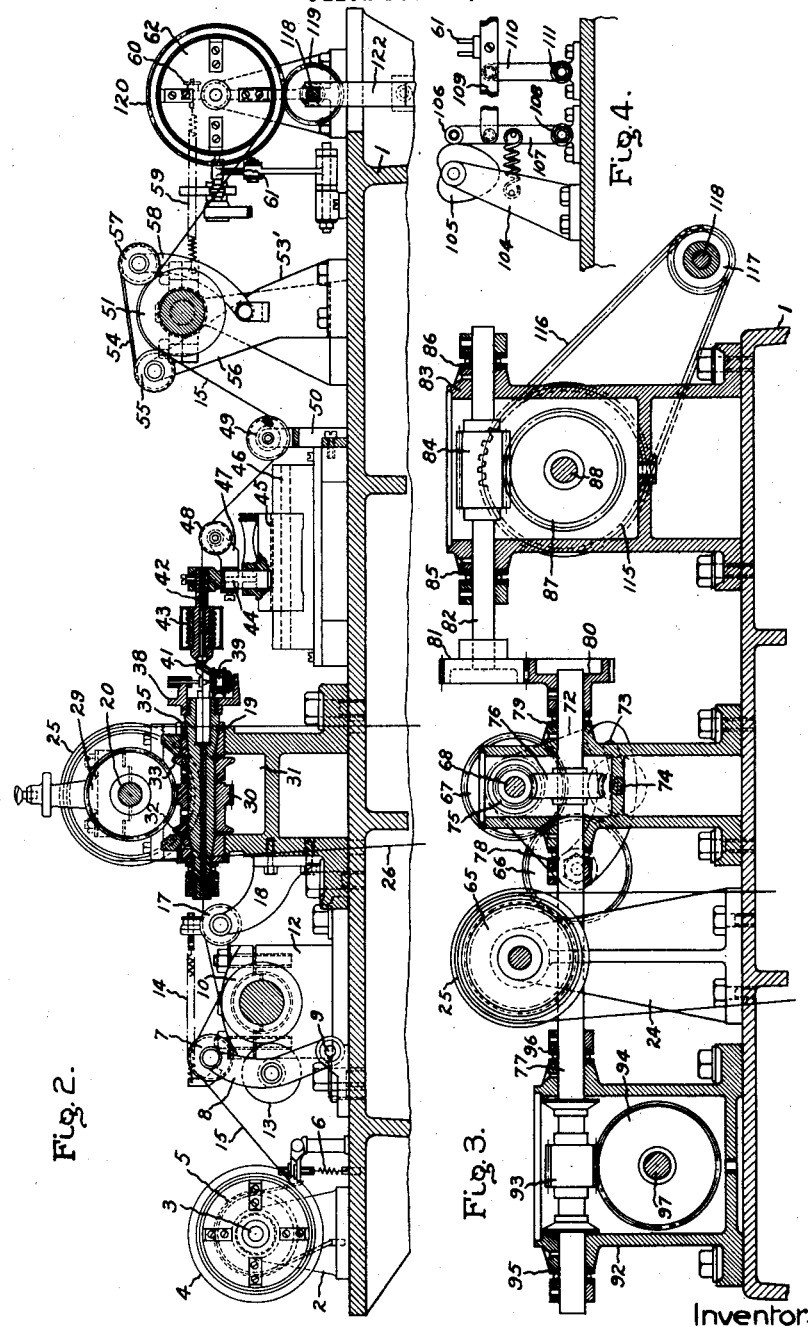

Patented Apr. 24, 1928.

1,667,677

UNITED STATES PATENT OFFICE.

HEINRICH MARTIN HUBERT REUFEL AND HENDRIK DE JONG, OF EINDHOVEN, AND WILLEM GUSTAAF FREDERIK WENTINK, OF THE HAGUE, NETHERLANDS, ASSIGNORS TO GENERAL ELECTRIC COMPANY, A CORPORATION OF NEW YORK.

WIRE-COILING MACHINE.

Application filed December 17, 1924, Serial No. 756,564, and in the Netherlands January 28, 1924.

This invention relates to improvements in machines for winding wires into helical coils and more particularly for winding fine wires into close coils. The machine according to the present invention is particularly adapted for making coiled filaments for electric incandescent lamps.

It has already been proposed to make machines of this kind in which the coil is wound upon a traveling mandrel which subsequent to the winding operation is removed in any suitable manner, for example by dissolving in chemical agents. Especially if helical coils of fine wire are to be wound to have a very small pitch it is of great importance not only that the rotary heads for winding the wire upon the mandrel should rotate at a uniform speed but also that the mandrel should move regularly.

The present invention has for its principal object to provide a winding machine in which practically no irregularities occur in the movement of the mandrel.

The mandrel is ordinarily a steel wire, herein referred to as mandrel wire, upon which a fine wire herein referred to as winding wire, is wound in a coil or helix. In a machine constructed according to the invention the winding wire is wound in a known manner upon a traveling mandrel wire. In accordance with this invention the machine has mandrel wire feed mechanism with driving surfaces which engage the bare mandrel wire prior to its passage through a winding head and also engage the wound mandrel wire after it emerges from the head, both surfaces being driven to have approximately the same speed. If the mandrel wire is to be moved at a uniform speed, as is usually the case, the driving surfaces must be the surfaces of solids of revolution.

According to the present invention the mandrel wire feed mechanism preferably has feed rolls and means for positively driving the feed rolls at approximately the same circumferential velocity.

As feed rolls can be driven at a very uniform speed, and the mandrel wire has the same speed as the feed rolls, the mandrel wire in the machine according to the present invention has a very uniform speed of travel. Very slight differences between the speeds of the mandrel wire driving surfaces, for example, between the circumferential velocities of the two feed rolls may be permissible. For instance, the driving surface along which the mandrel wire passes subsequent to the winding operation may be moved slightly faster than the driving surface along which the unwound mandrel wire passes, the portion of the mandrel wire between the two driving surfaces being thus continually under tension.

The mandrel wire may be unreeled from one spool and reeled up again on another spool subsequent to the winding operation. The spool for the bare mandrel wire is preferably so retarded by a brake that bare mandrel wire between the spool and the first driving surface remains continuously taut. In order that the wound mandrel wire between the second driving surface and the spool on which it is reeled up may be kept taut the latter may be driven through a friction clutch coupling.

In addition devices are preferably provided which prevent the mandrel wire from slipping on the driving surfaces of the feed rolls. According to the present invention the bare mandrel wire can be pressed against a feed roll by a spring pressed roller, and the wound mandrel wire may be pressed against the other feed roll by an endless belt on a set of rollers of which at least one is movable preferably by a spring for tightening the belt. Each feed roll may have an auxiliary pressure roller, and the mandrel wire may be passed once or several times around the two feed rolls.

If several winding heads and a corresponding number of mandrel wires with accessory devices are used, all winding heads are according to the present invention preferably actuated from a common shaft and all the feed rolls for the bare mandrel wire are disposed on one common shaft and all the feed rolls for the wound mandrel wire are disposed on a second common shaft.

The mandrel and the winding head are driven continuously to produce a continuous coil or helix, but if coils of a given length united by straight wire ends are desired the winding heads may be held periodically stationary, or the mandrel wire may be periodically moved at an increased speed.

Coils of a variable pitch may be made by periodically varying the rotation speed of the winding heads or the traveling speed of the mandrel wire.

The accompanying drawing illustrates a construction of a machine according to the present invention having four rotary winding heads. In this construction the mandrel wire as well as the winding heads are actuated continuously.

In the said drawings:

Figure 2 is a vertical section taken on the line II—II of Figure 1.

Figure 3 is a vertical section taken on the line III—III of Figure 1.

Figure 4 is a detail view of the device for guiding the wound mandrel wire on to the spool on which it is reeled.

Figure 1:
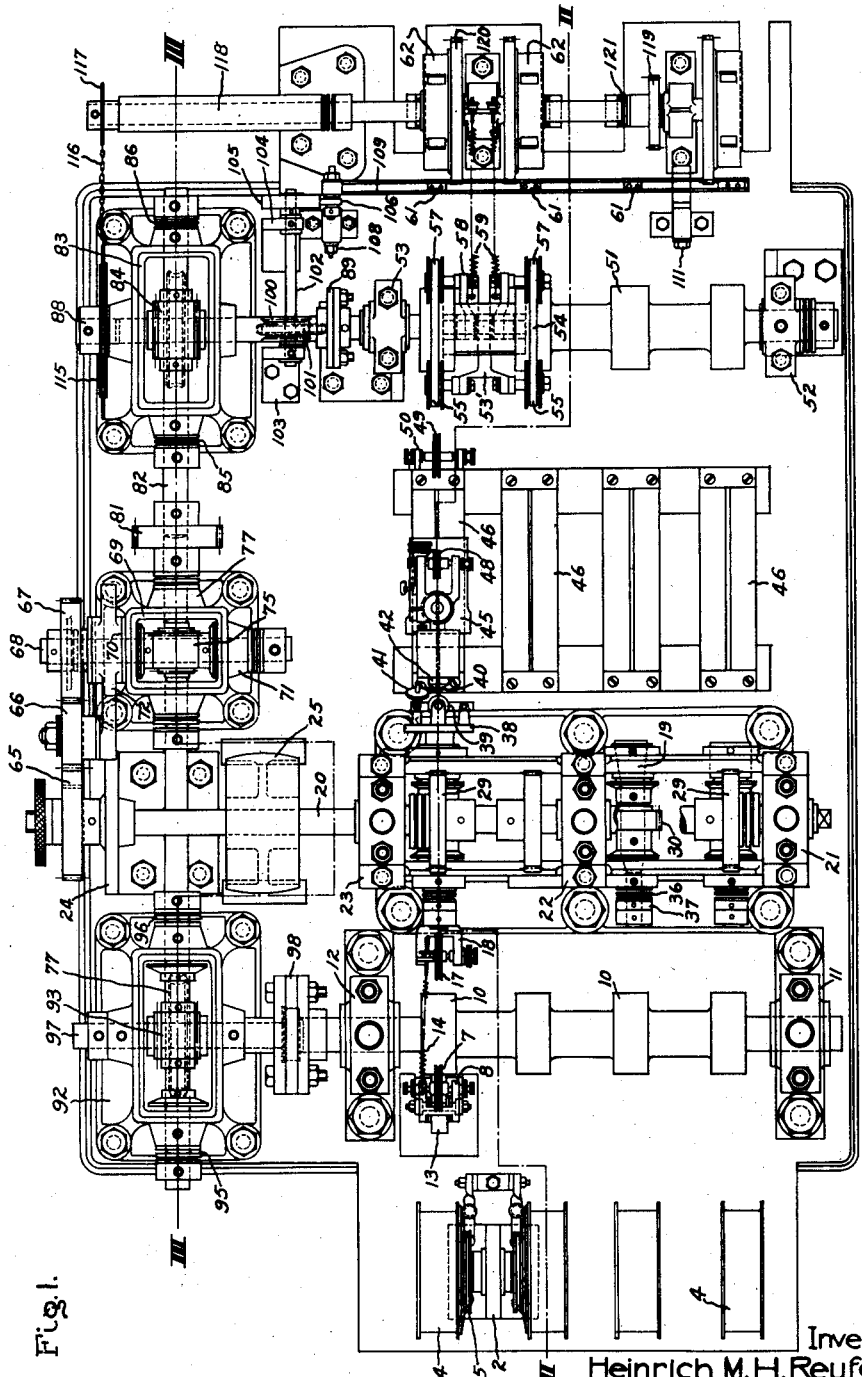
Figure 1 is a plan of a machine according to the present invention.

The operation of the machine can best be seen from Figure 2. The bare mandrel wire 15 is wound on a spool 4 rotatable on a spindle 3 in a bracket 2 mounted on the main frame 1 of the machine. The spool is yieldingly retarded by a brake such as a belt 5 kept taut by a spring 6.

From the spool 4 the mandrel wire passes over a roller 7 on the end of a lever 8 pivoted on the pin 9 and around a feed roll journaled in bearings 11 and 12. The mandrel wire is held against the driving surface of this feed roll 10 by a spring pressed roller 13 of hard material rotatably mounted on the lever 8, and held against the feed roll 10 by a spring 14. From the feed roll 10 the mandrel wire 15 passes over a guiding roller 17 on a bracket 18 then through the hollow shaft 19 of the winding head, and then through a stationary guide 42. At the entrance of this guide 42 the winding wire is helically wound upon the mandrel wire.

The hollow shaft 19 of the winding head is driven from a drive shaft 20 in bearings 21, 22, 23 and 24 on the main frame 1 of the machine. A driving pulley 25 permits the shaft 20 to be driven by any suitable driving means, for example an electric motor. On the drive shaft 20 is a worm wheel 29 (Figure 2) cooperating with a gear 30 rigidly attached to the hollow shaft 19. Collars 32 and 33 prevent throwing of the oil. The hollow shaft 19 is rotatable on conical journals in bearings 34 and 35 mounted in the wall of an oil receptacle 31. End thrust is taken up by a ball-bearing 36, and nuts 37 serve for drawing the shaft 19 into its bearings.

A winding cap 38 rigidly attached to the end of the hollow shaft 19, carries a spool 39 for the winding wire. As the winding head rotates, the winding wire 40 (Figure 1) passes from the spool 39 over a guide roller 41 (Figure 2) on the winding cap 38 to the entrance of the stationary guide 42, where it is helically wound on the mandrel wire 15 continuously moving through the guide. An electric heating coil 43 may be provided for heating the guide 42 which is fixed in a post 44 secured to a slide 45 slidably mounted on a guide 46. To the post 44 is also fixed an arm 47 which at its free end carries a guide roller 48 for the wound mandrel wire.

The wound mandrel wire passes over a guide roller 49 carried by a support 50 and thence to a feed roll 51 which rotates in bearings 52 and 53 at the proper circumferential velocity with relation to the feed roll 10. The wound mandrel wire is held against the driving surface of the feed roll 51 by an endless belt 54 which runs over a belt tightening pulley 57 on a spring pressed arm 58 controlled by a helical spring 59 the tension of which can be regulated by means of a set-screw 60, so that the belt 54 holds the wound mandrel wire against the driving surface of the feed roll 51 with the desired force.

Finally the wound mandrel wire is reeled up on a spool 62, a guide finger 61 (see also Figure 4) causing the mandrel wire to be wound on the spool 62 in regular adjacent turns.

In the machine illustrated the feed rolls 10 and 51 may rotate at the same angular speed and being of like diameters move the mandrel wire at a very uniform speed. By rotating the winding heads at a uniform speed, a uniformly wound coil is obtained even if very fine wires are wound into close coils such as those used as filaments for incandescent lamps.

The description heretofore given of Figure 2 of the drawing refers to only one mandrel wire, one winding head, etc. but the four mandrel wires, four winding heads and four sets of accessory devices are all constructed in exactly the same way and the driving surfaces which drive the mandrel wires prior and subsequent to the winding operation are combined into two common feed rolls.

The driving of the various parts of the machine illustrated will be described with reference to the Figures 1 and 3.

The drive shaft 20 of the machine is actuated by means of a pulley 25 (Figure 1) and carries in addition to the four worm wheels 29 for driving the winding heads, a gear wheel 65 cooperating with a gear wheel 66, in mesh with a gear wheel 67 on a shaft 68. Gear wheels 65 and 66 having a different ratio of gearing may be used. The spindle of the gear wheel 66 is carried by a link 72 (Figure 3) pivoted on the shaft 68 and provided with a slot 73 so that it can be fixed in various positions to the frame of the machine by means of a bolt 74. The shaft 68 (Figure 1) journaled in bearings 70 and 71 on a worm housing 69 carries a worm 75 which engages a worm wheel 76 on a countershaft 77 (Figure 3). End thrust is taken up by ball-bearings 78 and 79. The shaft 77 by means of cooperating gear wheels 80 and 81 drives a shaft 82 journaled in a worm housing 83. A worm 84 on the shaft 82 actuates a worm wheel 87 which rotates a shaft 88. End thrust of the shaft 82 is taken up by ball-bearings 85 and 86. The shaft 88 is connected by a coupling 89 to the feed roll 51 (Figure 1).

The shaft 77 (Figure 3) carries also a worm 93 which engages a worm wheel 94 in a housing 92 on the main frame 1 of the machine. The end thrust of the shaft 77 is taken up by ball-bearings 95 and 96. The worm wheel 94 is on a shaft 97 journaled in bearings on the worm housing 92 and connected by a coupling 98 to the feed roll 10 (Figure 1).

The feed rolls 10 and 51 are thus actuated from the main shaft 20 at a uniform speed which by a proper choice of gear wheels 65 and 66 (Figure 3) can be modified at will.

A shaft 88 (Figure 1) has a worm 100 which actuates a worm wheel 101 on a shaft 102 journaled in bearings 103 and 104. On the end of the shaft 102 is a cam 105 engaged by a cam roller 106, on the end of an arm 107 (Figure 4) pivoted on a pin 108. A horizontal rod 109 which carries four fingers 61 is fixed at one end to a lever 107 and at the other end to a lever 110 which is pivoted on pin 111. As the cam 105 rotates the lever 107 swings regularly and consequently the rod 109 reciprocates regularly causing the wound mandrel wire which passes between guide fingers 61 to be wound regularly upon the spools 62 (Figure 2).

On the shaft 88 near one end (Figure 1) is mounted a sprocket wheel 115 which by means of a chain 116 drives a sprocket wheel 117 on a shaft 118 which has a number of gear wheels 119 (Figure 2) connected to the shaft by friction clutch couplings 121 controlled by a leaf spring 122. The gear wheels 119 engage gear wheels 120 (Figure 2) on the spools 62. Friction clutch couplings 121 prevent the tension in the mandrel wire between the roll 51 and the roller 62 increasing too much, although this part of the wire is always taut.

What we claim as new and desire to secure by Letters Patent of the United States, is:—

1. In a coiling machine the combination with a winding head of a pair of mandrel wire feed members mounted with said winding head between them and movable to pass the mandrel wire longitudinally through said head and means for positively driving both of said members at such relative speed as to cause both members to move the mandrel wire at the same speed.

2. In a coiling machine the combination with a winding head of a pair of rotatable mandrel wire feed members having cylindrical surfaces and mounted with said winding head between them and rotatable to pass the mandrel wire longitudinally through the head, and means for positively rotating both members at such relative speed as to cause said surfaces to move the mandrel wire at the same speed.

3. In a coiling machine the combination with the winding head of a pair of rotatable mandrel wire feed members, means for positively rotating both members to cause one member to drive the bare mandrel wire and the other the wound mandrel wire at the same speed, a supply spool for mandrel wire and means for retarding said spool to maintain the mandrel wire taut between said spool and the rest of said members.

4. In a coiling machine the combination with a winding head of a pair of rotatable members mounted to feed a mandrel wire through said head, driving means for positively rotating both said members to cause one to move the bare wire and the other the wound wire at the same speed, a spool for receiving the wound mandrel wire, and a friction clutch coupling actuated from said driving means for rotating said spool.

5. In a coiling machine the combination with a winding head of a pair of movable wire feed members for passing the mandrel wire longitudinally through said head, means for positively driving both said members to cause one to move the bare mandrel wire in contact with it and the other the wound mandrel wire in contact with it at the same speed, and means for maintaining the mandrel wire in non-slipping contact with said feed members.

6. In a coiling machine the combination with a winding head of a pair of mandrel wire feed members having cylindrical surfaces movable to pass a mandrel wire longitudinally through said head, means for positively moving both members to cause said cylindrical surfaces to move the bare wire and the wound mandrel wire at the same speed and a roller cooperating with said feed members to maintain the mandrel wire in non-slipping contact with said cylindrical surfaces.

7. In a coiling machine the combination with a winding head of a wire feed member mounted to move the mandrel wire longitudinally through said head, driving means for said member and a belt traveling with a portion of the surface of said feed member to hold a mandrel wire between it and said surface in non-slipping contact with said surface.

8. In a coiling machine the combination with a winding head of a mandrel wire feed member having a cylindrical surface and rotatable to pass the mandrel wire longitudinally through said head, means for positively rotating said member, pulleys mounted adjacent said member, means for adjusting one of said pulleys to vary its distance from the cylindrical surface of said member and a flexible belt mounted on said pulleys to travel in contact with said surface.

9. In a coiling machine the combination with a winding head of a cylindrical mandrel wire feed roller mounted to move the mandrel wire longitudinally through said head, means for driving said member, a pair of pulleys mounted adjacent said member, a flexible belt on said pulleys to engage and travel with the surface of said member and a pivoted lever supporting one of said pulleys and resiliently adjustable toward and away from said feed member.

10. In a coiling machine the combination with a plurality of rotary winding heads, a plurality of pairs of mandrel feed members mounted on opposite sides of said heads and movable to pass a mandrel wire longitudinally through each head, all of said members on each side of said heads being mounted on a common shaft and means for driving said winding heads and common driving means for said feed members to positively drive them at such relative speeds that the pair of members for each winding head both move the mandrel wire passing through said head at the same speed.

11. In a coiling machine, the combination with a winding head for winding a wire around a mandrel, of mandrel wire feed mechanism for directing a flexible mandrel through said winding head and comprising two movable driving surfaces, one for engaging the bare mandrel prior to its entry into said head, and the other for engaging the wound mandrel after it leaves said head, and means for driving both said surfaces at approximately the same speed.

12. In a coiling machine, the combination with a winding head for winding a wire around a mandrel, of mandrel wire feed mechanism for directing a flexible mandrel through said winding head and comprising mandrel driving means in engagement with both the bare mandrel and the wound mandrel to drive both the bare and wound mandrel at substantially the same speed.

In witness whereof, we have hereunto set our hands this 21/24th day of November, 1924.

HEINRICH MARTIN HUBERT REUFEL.
HENDRIK de JONG.
WILLEM GUSTAAF FREDERIK WENTINK.